(12) United States Patent
Nakagawa et al.

(10) Patent No.: US 8,545,732 B2
(45) Date of Patent: Oct. 1, 2013

(54) ELECTRODE FILM FOR POLYMER ACTUATOR ELEMENT, AND POLYMER ACTUATOR ELEMENT COMPRISING THE SAME

(75) Inventors: Hideto Nakagawa, Settsu (JP); Takuya Arase, Settsu (JP); Kinji Asaka, Ikeda (JP)

(73) Assignees: Daikin Industries, Ltd., Osaka (JP); National Institute of Advanced Industrial Science And Technology, Tokyo (JP)

( * ) Notice: Subject to any disclaimer, the term of this patent is extended or adjusted under 35 U.S.C. 154(b) by 195 days.

(21) Appl. No.: 13/260,766

(22) PCT Filed: Mar. 19, 2010

(86) PCT No.: PCT/JP2010/001993
§ 371 (c)(1),
(2), (4) Date: Sep. 28, 2011

(87) PCT Pub. No.: WO2010/113416
PCT Pub. Date: Oct. 7, 2010

(65) Prior Publication Data
US 2012/0018680 A1    Jan. 26, 2012

(30) Foreign Application Priority Data
Mar. 31, 2009  (JP) .................. 2009-088193

(51) Int. Cl.
*H01B 1/24* (2006.01)
*H02N 11/00* (2006.01)
*C08K 3/00* (2006.01)
*C08L 27/12* (2006.01)
*C08L 27/16* (2006.01)

(52) U.S. Cl.
USPC ........................................... 252/511; 310/311

(58) Field of Classification Search
USPC ................. 252/511–514; 428/924; 310/311, 310/363, 800
See application file for complete search history.

(56) References Cited

U.S. PATENT DOCUMENTS

| | | | |
|---|---|---|---|
| 7,315,106 B2 * | 1/2008 | Asaka et al. | 310/300 |
| 8,004,146 B2 * | 8/2011 | Asaka et al. | 310/300 |
| 8,253,308 B2 * | 8/2012 | Ono et al. | 310/363 |
| 2006/0257645 A1 * | 11/2006 | Asaka et al. | 428/323 |
| 2006/0266981 A1 | 11/2006 | Asaka et al. | |

FOREIGN PATENT DOCUMENTS

| | | | |
|---|---|---|---|
| JP | 2007-138049 A | 6/2007 | |
| JP | 4038685 B2 | 11/2007 | |
| JP | 2007-324146 A | 12/2007 | |

OTHER PUBLICATIONS

Polymer Preprints, Japan; The Society of Polymer Science, Japan; vol. 53, No. 2, 2004, pp. 4816.
International Search Report of corresponding PCT Application No. PCT/JP2010/001993.
International Preliminary Report of corresponding PCT Application No. PCT/JP2010/001993.

* cited by examiner

*Primary Examiner* — Mark Kopec
(74) *Attorney, Agent, or Firm* — Global IP Counselors

(57) ABSTRACT

An electrode film for a polymer actuator element contains a fluororesin, a fluorine rubber, an ionic liquid, and a conductive filler.

18 Claims, 3 Drawing Sheets

ELECTRODE FILM FOR POLYMER ACTUATOR ELEMENT, AND POLYMER ACTUATOR ELEMENT COMPRISING THE SAME

CROSS-REFERENCE TO RELATED APPLICATIONS

This U.S. National stage application claims priority under 35 U.S.C. §119(a) to Japanese Patent Application No. 2009-088193, filed in Japan on Mar. 31, 2009, the entire contents of which are hereby incorporated herein by reference.

TECHNICAL FIELD

The present invention relates to electrode films for polymer actuator elements, and polymer actuator elements with the same.

BACKGROUND ART

Demand for small actuators has been increasing in the fields of medical instruments, equipment for industrial use, personal robot, micromachine, and the like.

Polymer actuators have been proposed as one type of small-size actuator. The polymer actuators are roughly classified into two types, i.e., (1) one that makes use of expansion/contraction through reduction/oxidation of an electron conducting polymer such as polypyrrole and polyaniline in an electrolyte (electron-conducting polymer actuator), and (2) one that comprises an ion-exchange membrane and a junction electrode and can function as an actuator by applying an electric potential difference to the ion-exchange membrane in a water-containing state to cause flection or deformation of the ion-exchange membrane (ion-conducting polymer actuator).

Both of the conventional electron-conducting polymer actuators and ion-conducting polymer actuators have been used mainly in an aqueous solution of electrolyte because an electrolyte is necessary for the operation thereof. This severely limits the applications of the polymer actuators. Therefore, development of an actuator element that may be driven in air is essential for allowing the polymer actuators to be practically used in a wider range of applications.

In order to drive the polymer actuators in air, it is necessary to prevent evaporation of water. To make it happen, a method of coating resins has been proposed. However, with this method, it is difficult to coat the resins completely, the coating may be easily broken by a small amount of gas generated from electrode reactions, and the resistance against deformation response increases due to the coating. Therefore, the method has not come into practical use. Additionally, for example, organic solvents having a high boiling point, such as propylene carbonate, have been used instead of water. However, this method has the same problems as described above. Moreover, these solvents have smaller ion conductivity than water, so that a problem of lower responsiveness is caused. Further, another problem in terms of durability is caused because of oxidation/reduction reactions on electrode surfaces.

In order to overcome these problems, actuator elements have been proposed, which can operate in air or in vacuum by using a gel of carbon nanotube and ionic liquid as a conductive expandable active layer. (See Polymer Preprints, Japan, vol. 53, 2nd, 2004, pp. 4816-4817, p. 2355).

These actuator elements, for example, have a structure in which their conductive layers, which include conductive filler, an ionic liquid and a polymer, are adhered to both surfaces of a gel electrolyte film including a polymer and an ionic liquid. When an electric potential difference is applied across the conductive layers, the ionic liquid is polarized, anions move toward a positive electrode and cations move toward a negative electrode. In the ionic liquid conventionally used, cation is bigger than anion, so that the negative electrode is expanded and the positive electrode is contracted. As a result, the actuator element is bent to the positive electrode.

For example, an actuator element has been proposed in Japanese Patent No. 4038685, which includes an electrode layer for the actuator element in which the electrode layer is a gel substance including a carbon nanotube, an ionic liquid, and a polymer.

However, it is still required to develop a polymer actuator element that has a large displacement amount, a high displacement rate, and generates a large force as a result of the displacement.

SUMMARY

Technical Problem

An object of the present invention is to provide an electrode film for a polymer actuator element that enables to provide a polymer actuator element that has a large displacement amount, a high displacement rate, and generates a large force as a result of the displacement.

Another object of the present invention is to provide a polymer actuator element that has a large displacement amount, a high displacement rate, and generates a large force as a result of the displacement.

Solution to Problem

The present invention relates to an electrode film for a polymer actuator element, comprising a fluororesin (A), a fluorine rubber (B), an ionic liquid (C), and a conductive filler (D).

Further, the present invention relates to an electrode film for a polymer actuator element comprising an electrode film for a polymer actuator element, comprising a fluororesin (A), a fluorine rubber (B), an ionic liquid (C), and a conductive filler (D).

Preferably, the fluorine rubber (B) is a cross-linked fluorine rubber.

Preferably, at least one of the fluororesin (A) and the fluorine rubber (B) contains a vinylidene fluoride unit.

Also preferably, a ratio of the vinylidene fluoride unit to the entire fluororesin (A) and fluorine rubber (B) is not less than 60 mole %.

Further preferably, a weight ratio of the fluororesin (A) to the fluorine rubber (B) is from 80:20 to 20:80.

Further preferably, in the electrode film, 5 to 70% by weight of the fluororesin (A) and the fluorine rubber (B) as a whole, 20 to 80% by weight of the ionic liquid (C), and 1 to 40% by weight of the conductive filler (D) are included.

Advantageous Effects of Invention

In the present invention, a polymer actuator element comprising an electrode film for a polymer actuator element can be used in air or in vacuum and has a large displacement amount, a high displacement rate, and generates a large force as a result of the displacement.

DESCRIPTION OF EMBODIMENTS

Figure 1:
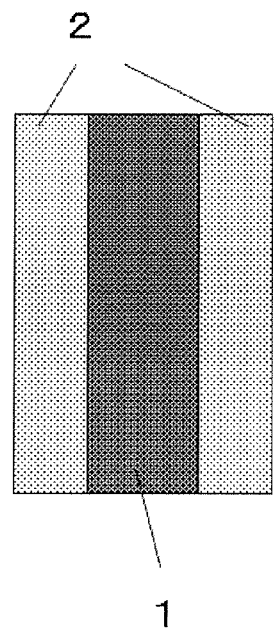
FIG. 1 is a diagram showing an example of the polymer actuator element of the present invention.

The electrode film for a polymer actuator element of the present invention comprises a fluororesin (A), a fluorine rubber (B), an ionic liquid (C), and a conductive filler (D).

Both the fluororesin (A) and fluorine rubber (B) are constituted by at least one of fluoride polymers. They are distinguished from each other by the fact that the fluororesin (A) does not show rubber elasticity and the fluorine rubber (B) shows the rubber elasticity, as commonly understood by a person of ordinary skill in the art. As will become apparent below, the fluororesin (A) includes crystalline resins having a melting point and/or noncrystalline resins having a rubber-transition temperature which is higher than room temperature. When the crystalline resins are used as the fluororesin (A), the fluororesin (A) can be distinguished from the fluorine rubber (B), which does not have a melting point, because the fluororesin (A) has a melting point.

A mixture of the fluororesin (A) and fluorine rubber (B) should be compatible with the ionic liquid. Therefore, at least one of the fluororesin (A) and fluorine rubber (B) should have polarity. Preferably, both of the fluororesin (A) and fluorine rubber (B) have polarity. Resins may be polarized, for example, by containing a structural unit derived from a polar fluorine-containing olefin. Preferably, the structural unit is a unit derived from vinylidene fluoride (VdF) which has a hydrogen atom. In this specification, the structural unit derived from the vinylidene fluoride (VdF) is referred to as vinylidene fluoride unit in some cases.

Accordingly, at least one of the fluororesin (A) and fluorine rubber (B) preferably contains the vinylidene fluoride unit, and more preferably both of the fluororesin (A) and fluorine rubber (B) contain the vinylidene fluoride unit.

The ratio of the vinylidene fluoride unit to the entire fluororesin (A) and fluorine rubber (B), namely to total mole number of the entire structural units constituting the fluororesin (A) and the fluorine rubber (B), is preferably not less than 60 mole %, in view of compatibility with the ionic liquid. And, in view of displacement amount of the actuator element, the ratio is preferably not more than 95 mole %, and is more preferably not more than 90 mole %.

In the electrode film for the polymer actuator element in the present invention, an amount of the vinylidene fluoride unit by mole (mole %) is determined, for example, by NMR analysis. In this specification, the amount of the vinylidene fluoride unit by mole is referred to as a VdF ratio in some cases.

Specifically, for example, a polymer dissolved in acetone-d6 is analyzed based on $^{19}$F-NMR analysis with trifluoroacetic acid as a reference material by using Varian NMR System400. Signals from −89 ppm to −110 ppm are defined as signals derived from VdF, and the VdF ratio is calculated based on a ratio of the intensity of the signals derived from VdF to the intensity of the other signals.

As will become apparent below, it is preferable that the fluorine rubber (B) is cross-linked. The fact that cross-linked fluorine rubber (B) is contained in the electrode film for polymer actuator element of the present invention is identified, for example, through a presence of polymers insoluble in a polar solvent such as acetone, and through an inconstant viscosity that changes in the low frequency region in the measurement of frequency dependency of the viscosity.

<Fluororesin (A)>

The fluororesin (A) is preferably compatible with an ionic liquid. Examples of the fluororesin (A) include polar fluororesins.

Examples of the polar fluororesins include fluorine-containing polymers and fluorine-containing copolymers, which contain structural units derived from polar fluorine-containing olefins. Among them, fluorine-containing polymers and fluorine-containing copolymers which contain vinylidene fluoride units are preferable.

The amount of the vinylidene fluoride units in the fluororesin (A) is preferably not less than 40 mole %, and more preferably not less than 60 mole %, in view of compatibility with the ionic liquid. The amount is preferably not more than 95 mole %, and more preferably not more than 90 mole %, in view of displacement amount of the actuator element.

Further, in view of adjusting the ratio of the vinylidene fluoride units to the entire fluororesin (A) and fluorine rubber (B), it is preferable that the ratio of the vinylidene fluoride units in the fluororesin (A) is high when the ratio of the vinylidene fluoride units in the fluorine rubber (B) is low.

Further, the polar fluororesins preferably include groups selected from the group consisting of —OH, —COOH, —COOR (R represents hydrocarbons having 1 to 20 carbon atoms), iodine atom, epoxy group and (meth)acryloyl group in a polymer side chain and/or at an end of a polymer main chain, in view of compatibility with the ionic liquid. Further, the main chain structure preferably contains a bond selected from the group consisting of ester bond, amide bond, ether bond and urethane bond.

Further, as described above, the fluororesin (A) includes crystalline resins having a melting point and/or noncrystalline resins having a rubber-transition temperature which is higher than room temperature. Among them, the crystalline resins are preferable.

Specifically, for the fluorine-containing polymers and fluorine-containing copolymers, the compounds represented by the following formula (A1) are preferable.

<Formula A1>

$$-(M^{a1})-(N^{a1})- \quad (A1)$$

In the formula, $M^{a1}$ represents a structural unit derived from vinylidene fluoride ($m^{a1}$ and $N^{a1}$ represents a structural unit derived from a monomer ($n^{a1}$) copolymerizable with the monomer ($m^{a1}$).

As is clear for a person of ordinary skill in the art, the formula (A1) shows that the structure unit $M^{a1}$ and the structure unit $N^{a1}$ can be combined in any combination and any order.

The amount of the structure unit $M^{a1}$ is preferably from 40 to 95 mole %, and more preferably from 60 to 90 mole %, in the fluorine-containing polymers or fluorine-containing copolymers.

Examples of the monomer ($n^{a1}$) include any monomer as long as it is copolymerizable with the monomer ($m^{a1}$), and for instance, may include a fluorine-containing monomer such as tetrafluoroethylene (TFE), chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, and perfluoro(alkyl vinyl ether) (PAVE); and a nonfluorine-containing monomer such as ethylene, propylene, and alkyl vinyl ether.

The fluororesin (A) preferably has a melting point between room temperature and 200° C., inclusively. More preferably, the melting point is 80° C. or more and 170° C. or less. Also, the resin preferably has a tensile rupture strength of 10 MPa or more and a tensile elastic modulus of 50 MPa or more. Further, the resin is preferably dissolvable in an aprotic polar solvent such as methylpentanone.

The fluororesin (A) is available as commercialized products such as Kynar Flex PPA 2801, 2501, 2751 (Arkema Co.), THV 220G, 415G, 500G (Dyneon Co.), or can be produced by common manufacturing processes.

<Fluorine Rubber (B)>

The fluorine rubber (B) is preferably compatible with an ionic liquid. Examples of the fluorine rubber (B) include nonperfluoro fluorine rubber containing a structural unit derived from polar olefin fluorides. Examples of the polar olefin fluorides include olefin fluorides having a hydrogen atom, such as vinylidene fluoride.

Further, the fluorine rubber (B) is preferably cross-linked. Any common processes known as fluorine rubber cross-linking processes are applicable to the cross-linking process of the fluorine rubber (B). Specifically, examples of the cross-linking process include polyamine cross-linking, polyol cross-linking, peroxide cross-linking, and heterocyclic compound cross-linking. Among them, peroxide cross-linking is preferable because cross-linking reactivity thereof can be easily controlled.

The cross-linking agent used in peroxide cross-linking can be any organic peroxide as long as it can easily generate a peroxy radical in the presence of heat or an oxidization-reduction system. Specifically, examples of them include 1,1-bis(t-butylperoxy)-3,5,5-trimethylcyclohexane, 2,5-dimethylhexane-2,5-dihydroperoxide, di-t-butylperoxide, t-butylcumylperoxide, dicumylperoxide, α,α-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoylperoxide, t-butylperoxybenzene, t-butylperoxy maleate and t-butylperoxyisopropyl carbonate. Among them, 2,5-dimethyl-2,5-di(t-butylperoxy)hexane is preferable.

Examples of the cross-linking agent used for peroxide cross-linking include triallyl cyanurate, triallyl isocyanurate (TAIC), triacrylformal, triallyl trimellitate, N,N'-m-phenylenebismaleimide, dipropargyl terephthalate, diallyl phthalate, tetraallylterephthalateamide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallylacrylamide and 1,6-divinyldodecafluorohexane, hexaallylphosphoramide, N,N,N',N'-tetraallylphthalamide, N,N,N',N'-tetraallylmalon amide, trivinylisocyanurate, 2,4,6-trivinylmethyltrisiloxane, tri(5-norbornene-2-methylene)cyanurate, triallylphosphite. Among them, triallyl isocyanurate (TAIC) is preferable in view of cross-linkability and the property of the cross-linked resultant.

Examples of the nonperfluoro fluorine rubber include vinylidene fluoride (VdF) fluorine rubber, tetrafluoroethylene (TFE)/propylene fluorine rubber, tetrafluoroethylene (TFE)/propylene/vinylidene fluoride (VdF) fluorine rubber, ethylene/hexafluoropropylene (HFP) fluorine rubber, ethylene/hexafluoropropylene (HFP)/vinylidene fluoride (VdF) fluorine rubber, ethylene/hexafluoropropylene (HFP)/tetrafluoroethylene (TFE) fluorine rubber, fluorosilicone fluorine rubber and fluorophosphazene fluorine rubber. These can be used alone or can be used in arbitrary combinations, as long as the effects of the present invention are not lost.

Among them, vinylidene fluoride fluorine rubber is preferable in view of the advantage of the present invention.

The amount of vinylidene fluoride unit in the vinylidene fluoride fluorine rubber is preferably 40 mole % or more, and more preferably, 60 mole % or more, in view of compatibility with an ionic liquid. Further, the amount is preferably 85 mole % or less so that the vinylidene fluoride fluorine rubber can be characterized as a rubber.

Further, in view of adjusting the ratio of the vinylidene fluoride unit to the total of the fluororesin (A) and the fluorine rubber (B), it is preferable that the ratio of the vinylidene fluoride unit in the fluorine rubber (B) (vinylidene fluoride fluorine rubber) is high when the ratio of the vinylidene fluoride unit in the fluororesin (A) is low.

Specifically, preferable examples of the vinylidene fluoride fluorine rubber are represented by the following formula (B1).

$$-(M^{b1})-(M^{b2})-(N^{b1})-\qquad(B1)$$

In the formula, $M^{b1}$ represents a structural unit derived from vinylidene fluoride ($m^{b1}$), $M^{b2}$ represents a structural unit derived from a fluorine-containing ethylene monomer ($m^{b2}$) other than vinylidene fluoride, and $N^{b1}$ represents a structural unit derived from a monomer ($n^{b1}$) copolymerizable with the monomers ($m^{b1}$) and ($m^{b2}$).

As will be understood by a skilled person in the art, in the formula (B1), the structural unit ($M^{b1}$), the structural unit ($M^{b2}$) and the structural unit ($N^{b1}$) can be combined in any combination and any order.

The vinylidene fluoride fluorine rubber represented by the formula (B1) preferably contains 45-85 mole % of the structural unit $M^{b1}$ and 55-15 mole % of the structural unit $M^{b2}$, and more preferably contains 60-80 mole % of the structural unit $M^{b1}$ and 40-20 mole % of the structural unit $M^{b2}$. The structural unit $N^{b1}$ is preferably 0-10 mole % to the total of the structural units $M^{b1}$ and $M^{b2}$.

One or two or more kinds of monomers can be used as the fluorine-containing ethylene monomer other than vinylidene fluoride ($m^{b2}$). Examples of the monomer ($m^{b2}$) include fluorine-containing monomers such as tetrafluoroethylene (TFE), chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, perfluoro(alkyl vinyl ether) (PAVE) and vinyl fluoride. Of these, tetrafluoroethylene, hexafluoropropylene and perfluoro(alkyl vinyl ether) are preferably used.

Any monomer which can copolymerize with the monomer ($m^{b1}$) and the monomer ($m^{b2}$) can be used as the monomer ($n^{b1}$). For example, ethylene, propylene, alkyl vinyl ether or the like can be used as the monomer ($n^{b1}$).

Further, monomers which can introduce cross-linkable sites are preferable as the monomer ($n^{b1}$).

Examples of the monomers which can introduce cross-linkable sites include iodine atom-containing monomers or bromine atom-containing monomers represented by the following formula (B2):

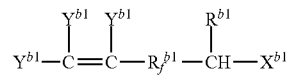

<In the formula, $Y^{b1}$ represents hydrogen atom, fluorine atom, or methyl group;

$R_f^{b1}$ represents fluoroalkylene group, perfluoroalkylene group, fluoropolyoxialkylene group, or perfluoropolyoxialkylene group;

$R^{b1}$ represents hydrogen atom, or methyl group; and $X^{b1}$ represents iodine atom or bromine atom.>, and include monomers represented by the following formula (B3):

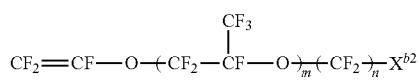

<In the formula, m is an integer 0-5, n is an integer 1-3, and $X^{b2}$ represents cyano group, carboxyl group, alkoxycarbonyl group, iodine atom or bromine atom.>, and further include monomers represented by the following formula (B4):

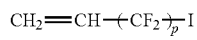

<In the formula, p is an integer 1-10.>, and further include iodine-containing monomers such as perfluoro(6,6-dihydro-6-iodo-3-oxa-1-hexene) and perfluoro(5-iodo-3-oxa-1-pentene) described in JP-B-5-63482 and JP-A-7-316234, iodine-containing monomers such as $CF_2$=$CFOCF_2CF_2CH_2I$ described in JP-A-4-217936, bromine-containing monomers described in JP-A-4-505341, a monomer containing a cyano group, a monomer containing a carboxyl group and a monomer containing an alkoxycarbonyl group described in JP-A-4-505345 and JP-A-5-500070.

These can be used alone or in arbitrary combination.

Specifically, preferable examples of the vinylidene fluoride (VdF) fluorine rubber include VdF/HFP rubber, VdF/HFP/TFE rubber, VdF/CTFE rubber, and VdF/CTFE/TFE rubber.

The fluorine rubber (B) may be available as commercialized products, or can be produced by known processes.

<Ionic Liquid (C)>

Ionic liquid (C) used in the present invention is known as a normal temperature molten salt, or simply known as a molten salt or the like, and is a salt that exhibits a molten state within a wide temperature range including normal temperature (room temperature).

In the present invention, while various known ionic liquids can be used, it is preferable to use those that are stable and exhibit a liquid state at normal temperature (room temperature) or a temperature as close to normal temperature as possible. In the present invention, normal temperature molten salts having electric conductivity of not less than 0.1 Sm$^{-1}$ are preferable.

Examples of the ionic liquid (C) include those comprising a cation (preferably imidazolium ion) represented by the following formulae (C1) to (C4) and an anion ($X^-$).

Formula (C1):

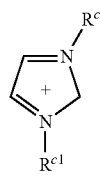

Formula (C2):

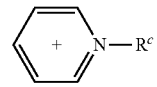

Formula (C3):

$[NR^c_xH_{4-x}]^+$

Formula (C4):

$[PR^c_xH_{4-x}]^+$

In the formulae (C1) to (C4), $R^c$ represents: an alkyl group which may be substituted by one or more halogen atoms and has 1 to 12 carbon atoms; or an alkyl group which may be substituted by one or more halogen atoms, may have an ether bond instead of methylene group, and has the total number of carbon atoms and oxygen atoms of 3 to 12. And in the formula (C1), $R^{c1}$ represents a hydrogen atom or an alkyl group which may be substituted by one or more halogen atoms and has 1 to 4 carbon atoms.

Further, in the formulae (C3) and (C4), each x is an integer of 1 to 4.

In the formula (C1), it is preferable that $R^c$ and $R^{c1}$ are not the same.

Further, examples of the ionic liquid (C) include fluorine-containing imidazole salts comprising a cation (preferably imidazolium ion) represented by the following formula (C5) and an anion ($X^-$).

Formula (C5):

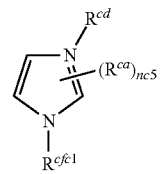

In the formula, $R^{ca}$s may be the same or different, and each is a halogen atom, a functional group or an organic group;

nc5 is an integer of 0 to 3;

$R^{cfc1}$ represents (1) a group represented by the following formula (c) or (2) a monovalent organic group which may be substituted by a residue obtained by excluding $R^{cfc1}$ group from the formula (C5):

Formula (c)

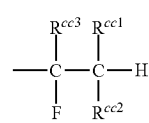

<In the formula, $R^{cc1}$, $R^{cc2}$ and $R^{cc3}$ may be the same or different, and each is (a) a hydrogen atom, (b) a halogen atom, (c) a functional group, or (d) a monovalent organic group which may be substituted by a halogen atom and may have a polymerizable group which may have an ether bond>; and $R^{cd}$ represents a hydrogen atom or a monovalent organic group.

Nonlimiting examples of cations represented by the formulae (C1) to (C5) include, for instance, non-fluorine-containing imidazole compound cations such as 1-ethyl-3-methylimidazolium cation, 1-methyl-3-propylimidazolium cation, 1-isopropyl-3-methylimidazolium cation, 1-butyl-3-methylimidazolium cation, 1-isobutyl-3-methylimidazolium cation, 1-sec-butyl-3-methylimidazolium cation, 1-methoxymethyl-3-methylimidazolium cation, 1-methoxyethyl-3-methylimidazolium cation, 1-ethyl-3-propylimidazolium cation, 1-ethyl-3-isopropylimidazolium cation, 1-ethyl-3-butylimidazolium cation, 1-ethyl-3-isobutylimidazolium cation, 1-ethyl-3-sec-butylimidazolium cation, 1-ethyl-3-methoxymethylimidazolium cation, 1-ethyl-3-methoxyethylimidazolium cation, 1-methylimidazolium cation, 1-ethylimidazolium cation, 1-propylimidazolium cation, 1-isopropylimidazolium cation, 1-butylimidazolium cation, 1-isobutylimidazolium cation, 1-sec-butylimidazolium cation, 1-methoxymethylimidazolium cation, 1-methoxyethylimidazolium cation, 1,2-dimethyl-3-ethylimidazolium cation, 1,2-dimethyl-3-propylimidazolium cation, 1,2-dimethyl-3-isopropylimidazolium cation, 1,2-dimethyl-3-butylimidazolium cation, 1,2-dimethyl-3-isobutylimidazolium cation, 1,2-dimethyl-3-sec-butylimidazolium cation, 1,2-dimethyl-3-methoxymethylimidazolium cation and 1,2-dimethyl-3-methoxyethylimidazolium cation; and fluorine-containing imidazole compound cations such as 1-methyl-3-trifluoromethylimidazolium cation, 1-difluoromethyl-3-methylimidazolium cation, 1-methyl-3-pentafluoroethylimidazolium cation, 1-methyl-3-(2,2,2-trifluoroethyl)imidazolium cation, 1-(1,1-difluoroethyl)-3-methylimidazolium cation, 1-methyl-3-(1,1,2,2-tetrafluoroethyl)imidazolium cation, 1-(2-chloro-1,1,2-trifluoroethyl)-3-methylimidazolium cation, 1-heptafluoropropyl-3-methylimidazolium cation, 1-heptafluoroisopropyl-3-methylimidazolium cation, 1-(1,1,2,3,3,3-hexafluoropropyl)-3-methylimidazolium cation, 1-methyl-3-(1,1,2,3,3,4,4,4-octafluorobutyl)imidazolium cation, 1-methyl-3-(2-trifluoromethoxy-1,1,2-trifluoroethyl)imidazolium cation, 1-(2-heptafluoropropoxy-1,1,2-trifluoroethyl)-3-methylimidazolium cation, 1-ethyl-3-trifluoromethylimidazolium cation, 1-difluoromethyl-3-ethylimidazolium cation, 1-ethyl-3-pentafluoroethylimidazolium cation, 1-ethyl-3-(2,2,2-trifluoroethyl)imidazolium cation, 1-(1,1-difluoroethyl)-3-ethylimidazolium cation, 1-ethyl-3-(1,1,2,2-tetrafluoroethyl)imidazolium cation, 1-(2-chloro-1,1,2-trifluoroethyl)-3-ethylimidazolium cation, 1-ethyl-3-heptafluoropropylimidazolium cation, 1-ethyl-3-heptafluoroisopropylimidazolium cation, 1-ethyl-3-(1,1,2,3,3,3-hexafluoropropyl)imidazolium cation, 1-ethyl-3-(1,1,2,3,3,4,4,4-octafluorobutyl)imidazolium cation, 1-ethyl-3-(2-trifluoromethoxy-1,1,2-trifluoroethyl)imidazolium cation, 1-ethyl-3-(2-heptafluoropropoxy-1,1,2-trifluoroethyl)imidazolium cation, 1-trifluoromethylimidazolium cation, 1-difluoromethylimidazolium cation, 1-pentafluoroethylimidazolium cation, 1-(2,2,2-trifluoroethyl)imidazolium cation, 1-(1,1-difluoroethyl)imidazolium cation, 1-(1,1,2,2-tetrafluoroethyl)imidazolium cation, 1-(2-chloro-1,1,2-trifluoroethyl)imidazolium cation, 1-heptafluoropropylimidazolium cation, 1-heptafluoroisopropylimidazolium cation, 1-(1,1,2,3,3,3-hexafluoropropyl)imidazolium cation, 1-(1,1,2,3,3,4,4,4-octafluorobutyl)imidazolium cation, 1-(2-trifluoromethoxy-1,1,2-trifluoroethyl)imidazolium cation, 1-(2-heptafluoropropoxy-1,1,2-trifluoroethyl)imidazolium cation, 2-fluoro-1-ethyl-3-methylimidazolium cation, 2-fluoro-1-methyl-3-propylimidazolium cation, 2-fluoro-1-isopropyl-3-methylimidazolium cation, 2-fluoro-1-butyl-3-methylimidazolium cation, 2-fluoro-1-isobutyl-3-methylimidazolium cation, 2-fluoro-1-sec-butyl-3-methylimidazolium cation, 2-fluoro-1-methoxymethyl-3-methylimidazolium cation, 2-fluoro-1-methoxyethyl-3-methylimidazolium cation, 2-fluoro-1-methyl-3-trifluoromethylimidazolium cation, 2-fluoro-1-methyl-3-pentafluoroethylimidazolium cation, 2-fluoro-1-methyl-3-(2,2,2-trifluoroethyl)imidazolium cation, 2-fluoro-1-(1,1-difluoroethyl)-3-methylimidazolium cation, 2-fluoro-1-methyl-3-(1,1,2,2-tetrafluoroethyl)imidazolium cation, 1-(2-chloro-1,1,2-trifluoroethyl)-2-fluoro-3-methylimidazolium cation, 2-fluoro-1-heptafluoropropyl-3-methylimidazolium cation, 2-fluoro-1-heptafluoroisopropyl-3-methylimidazolium cation, 2-fluoro-1-(1,1,2,3,3,3-hexafluoropropyl)-3-methylimidazolium cation, 2-fluoro-1-methyl-3-(1,1,2,3,3,4,4,4-octafluorobutyl)imidazolium cation, 2-fluoro-1-methyl-3-(2-trifluoromethoxy-1,1,2-trifluoroethyl) imidazolium cation, 2-fluoro-1-(2-heptafluoropropoxy-1,1,2-trifluoroethyl)-3-methylimidazolium cation, 1,2-dimethyl-3-trifluoromethylimidazolium cation, 1,2-dimethyl-3-pentafluoroethylimidazolium cation, 1,2-dimethyl-3-(2,2,2-trifluoroethyl)imidazolium cation, 1,2-dimethyl-3-(1,1-difluoroethyl)imidazolium cation, 1,2-dimethyl-3-(1,1,2,2-tetrafluoroethyl)imidazolium cation, 1,2-dimethyl-3-(2-chloro-1,1,2-trifluoroethyl)imidazolium cation, 1,2-dimethyl-3-heptafluoropropylimidazolium cation, 1,2-dimethyl-3-heptafluoroisopropylimidazolium cation, 1,2-dimethyl-3-(1,1,2,3,3,3-hexafluoropropyl)imidazolium cation, 1,2-dimethyl-3-(1,1,2,3,3,4,4,4-octafluorobutyl)imidazolium cation, 1,2-dimethyl-3-(2-trifluoromethoxy-1,1,2-trifluoroethyl)imidazolium cation, and 1,2-dimethyl-3-(2-heptafluoropropoxy-1,1,2-trifluoroethyl)imidazolium cation.

Among them, preferable examples of the cation represented by the formulae (C1) to (C5) include 1-ethyl-3-methylimidazolium cation, 1-butyl-3-methylimidazolium cation, and 1,2-dimethyl-3-isobutylimidazolium cation.

As the anion ($X^-$), it is preferable to select at least one from tetrafluoroboric acid anion, hexafluorophosphoric acid anion, bis(trifluoromethanesulfonyl)imidic acid anion, perchloric acid anion, tris(trifluoromethanesulfonyl)carbonic acid anion, trifluoromethanesulfonic acid anion, dicyanamide anion, trifluoroacetic acid anion, organic carboxylic acid anion and halogen ion.

The salts containing the cation represented by the formulae (C1) to (C5) (preferably an imidazolium ion) and the anion ($X^-$) can be produced by known processes such as the known process described in JP-A-2007-204682 or compatible processes therewith.

<Electroconductive Filler (D)>

Examples of the electroconductive nano-filler (D) include electroconductive nano carbon materials and nano particles of electroconductive metals. And at least one or two or more of them can be selected and used. Here, "nano-filler" means a filler having a structure (in the form of particle, sheet, layer, needle, bar, fiber or tube) of nano level (0.1 nm to 1,000 nm) in at least a part thereof. Each of the electroconductive nano-fillers is explained below.

(1) Electroconductive Nano Carbon Materials

Among compounds comprising carbon atoms and having a structure of nano level, those having conductivity are used, and examples thereof are as follows.

(1-1) Fullerene

Fullerene is a carbon molecule having 60 or more carbon atoms and having a structure formed by bonds of carbon atoms in a spherical form.

(1-2) Carbon Nano Ball (Carbon Black)

Carbon nano ball is a black or ivory black powder resulted from thermal decomposition of incomplete combustion product of hydrocarbon compound.

(1-3) Carbon Nanofiber

Carbon nanofiber is synthesized through thermal decomposition of carbon sources of gaseous phase by using a metallic catalyst, such as iron and cobalt, under adequate conditions. As the structure of a fibrous carbon, there are three kinds of mainly known orientation of carbon network with respect to the fiber axis, that is, parallel (ribbon type), vertical (platelet type) and inclined (herringbone type).

(1-4) Carbon Nanotube (CNT)

Carbon nanotube is a kind of carbon nanofiber. It is a kind of fullerene in which a six-member ring network (graphene sheet) formed by carbon atoms is in the form of a single layer or a coaxial tubular multilayer structure. Carbon nanotube having a single layer is called a single-wall nanotube (SWNT), and one having a multilayer structure is called a multi-wall nanotube (MWNT). Especially, one having two layers is called a double wall nanotube (DWNT).

(1-5) Carbon Nanohorn (CNH)

Carbon nanohorn is a kind of carbon nanofiber. Carbon nanohorn has a carbon structure in which six-member ring networks (graphene sheet) formed by carbon atoms are generally connected in a form of multi-layer horns.

Examples of these nano carbon materials include those disclosed in Chemical Industry Vol. 56, pp. 50-62 (2005) and Langmuir, Vol. 11, pp. 3, 682-3,866 (1995). Among these nano carbon materials, carbon nanofibers are preferable, and carbon nanotubes are especially preferable.

(2) Nano Particles of Electroconductive Metal

Nano particles of electroconductive metal are metal particles having a particle size of 1 nm to 100 nm. Examples of suitable nano particles of metal include nano particles comprising a metal selected from gold, silver, copper, platinum, palladium, nickel, rhodium, aluminum, tin, zinc, lead, titanium and tantalum, and nano particles of alloy comprising two or more of metals selected from gold, silver, copper, platinum, palladium, nickel, rhodium, aluminum, tin, zinc, lead, titanium and tantalum and carbon. Nano particles of metal are appropriately selected according to purpose and applications.

While the electroconductive nano-filler may be appropriately selected depending on environment where it is used, electroconductive nano carbon materials, and further carbon nanotubes, are preferable since they have a large surface area and a high conductivity due to quantum effect or the like. Nonlimiting example of suitable carbon nanotube which has been put into practical use includes HiPco (available from Carbon Nanotechnology, Incorporated) which can be produced in a relatively large scale using carbon monoxide as a raw material.

The electroconductive filler (D) may be available as commercialized products, or can be produced by common manufacturing processes.

<Electrode Film for a Polymer Actuator Element>

As described above, in the electrode film for the polymer actuator element of the present invention, the ratio of the vinylidene fluoride unit to the entire fluororesin (A) and fluorine rubber (B) is preferably not less than 60 mole %, in view of compatibility with the ionic liquid. The ratio is preferably not more than 90 mole %, and more preferably not more than 87 mole % in view of the displacement amount of the actuator element.

The ratio can be adjusted with the ratio of the vinylidene fluoride unit to the fluororesin (A), the ratio of the vinylidene fluoride unit to the fluorine rubber (B), and the weight ratio of the fluororesin (A) to the fluorine rubber (B).

The ratio of the produced electrode film for a polymer actuator element of the present invention can be determined through NMR analysis.

In the electrode film for the polymer actuator element of the present invention, the weight ratio of the fluororesin (A) to the fluorine rubber (B) is generally from 90:10 to 20:80, preferably from 80:20 to 20:80, and more preferably from 80:20 to 50:50.

In view of the displacement amount of the actuator element, the higher ratio of the fluorine rubber (B) is preferable. On the other hand, in view of the force generated, the higher ratio of the fluororesin (A) is preferable.

The electrode film for the polymer actuator element of the present invention preferably includes 5 to 70% by weight of the fluororesin (A) and fluorine rubber (B) as a whole, 20 to 80% by weight of the ionic liquid (C), and 1 to 40% by weight of the conductive filler (D).

The thickness of the electrode film for the polymer actuator element of the present invention is preferably from 0.01 mm to 0.5 mm.

In view of the displacement amount of the actuator element, a smaller thickness is preferable. On the other hand, in view of the force generated, a larger thickness is preferable.

<Polymer Actuator Element>

The polymer actuator element of the present invention includes the electrode film of the present invention explained above.

Examples of the polymer actuator element of the present invention include one having at least two electrode films of the present invention, which are formed to be insulated from each other, on the surface of an ion conductive layer.

In the polymer actuator element of the present invention, flection or deformation of the element can be caused by applying an electrical potential difference to the electrode films (electrode films).

Further, examples of the polymer actuator element of the present invention include a polymer actuator element which is provided with a conductive layer formed on an outside surface, i.e. the opposite surface of the ion conductive layer, of the electrode film.

Figure 2:
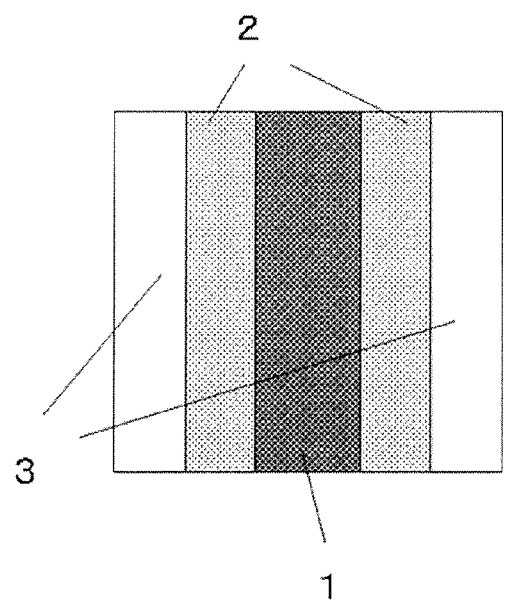
FIG. 2 is a diagram showing another example of the polymer actuator element of the present invention.

More specifically, for example, the polymer actuator element of the present invention may be a three-layer structure which comprises an ion conductive layer 1 sandwiched between at least one pair of the electrode layers 2 of the present invention having carbon nanotubes, ion liquids, and polymers (see FIG. 1). Further, in order to increase the conductivity of the electrode surface, the polymer actuator element may be a five-layer structure which further comprises conductive layers 3 on the respective outside surfaces of the two electrode layers 2 (i.e., on the surfaces opposite to the ion conductive layer) (see FIG. 2)

The ion conductive layer is preferably constituted with a composition in the form of gel. The composition preferably includes a polymer and an ionic liquid. The mass ratio of the hydrophilic ionic liquid to the polymer is preferably 1:4 to 4:1. The ratio of the hydrophilic ionic liquid to the polymer is more preferably 1:2 to 2:1.

In the actuator element of the present invention, when a direct current voltage of 0.5 to 3 V is applied, a displacement of about 0.5 to 1 time the element length can be obtained within several seconds. This actuator element can operate flexibly in air or in vacuum. The theory behind the operation of such an actuator element is that, when an electric potential difference is applied across the pair of electrode layers 2 which are formed on the surfaces of the ion conductive layer 1 and are insulated from each other, an electric double layer is formed at an interface between the ionic liquid phase and the carbon nanotube phase in the electrode layers 2, and the electrode layers 2 undergo expansion and shrinkage due to a resulting interfacial stress. It can be considered that the reason why the actuator element of the present invention bends toward the positive electrode (i.e., positive electrode side is contracted) is that there is an effect of causing larger expansion of the carbon nanotube at the negative electrode side due to a quantum chemical effect and also that, in ionic liquids commonly used nowadays, an ionic radius of the cation is large and, due to its steric effect, the negative pole side undergoes larger expansion.

Figure 3:
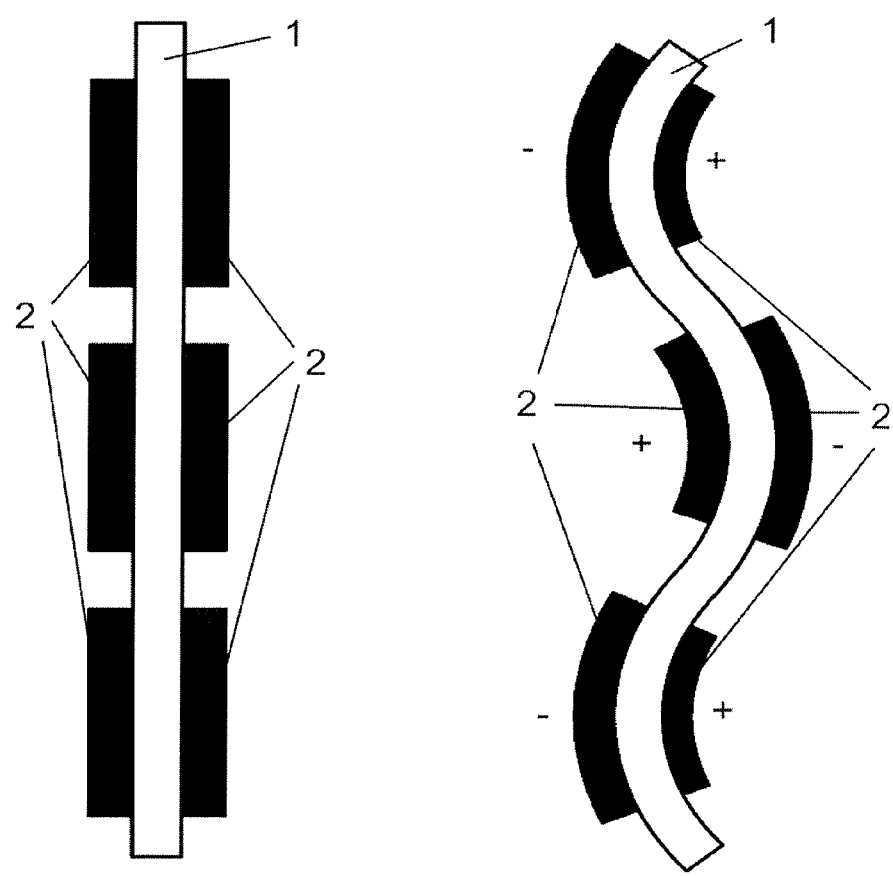
FIG. 3 is a diagram showing another example of the polymer actuator element of the present invention.
Figure 4:
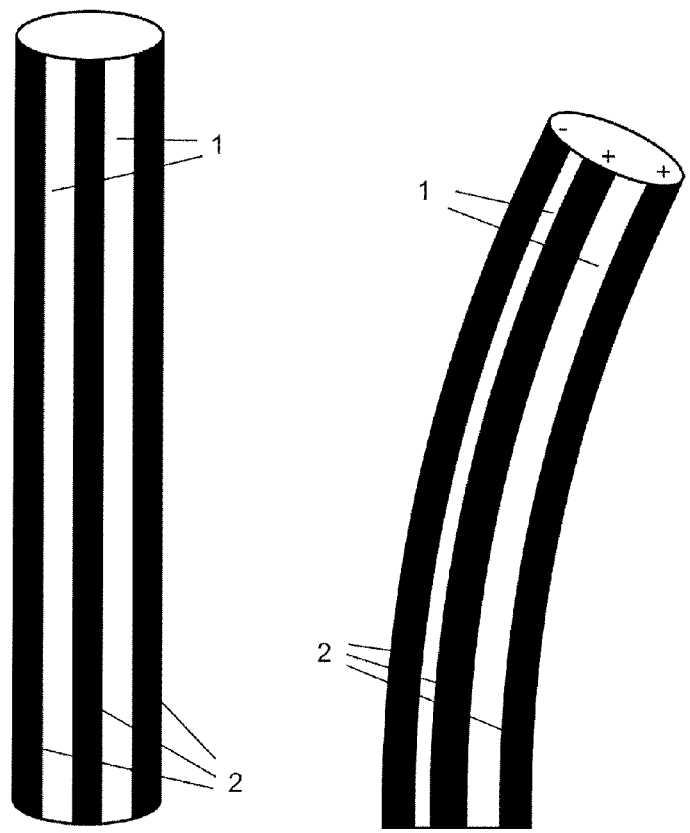
FIG. 4 is a diagram showing another example of the polymer actuator element of the present invention.

Further, as shown in FIG. 3, it is possible to cause the actuator to make a complicated movement by providing multiple electrode layers 2 on the surfaces of the flat ion conductive layer 1. Such an actuator element enables transportation by peristaltic movements and a micro manipulator can be realized. Also, the shape of the actuator element of the present invention is not limited to a flat shape, and elements having arbitrary shapes can be easily produced. For example, an actuator element shown in FIG. 4 is one having four electrode layers 2 along a circumference of the ion conductive layer 1 in the form of a rod having a diameter of about 1 mm. This element makes it possible to realize an actuator which can be inserted into a capillary tube.

The thickness of the electrode film for the polymer actuator element of the present invention is preferably from 0.01 mm to 0.5 mm. In view of the displacement amount of the actuator element, a smaller thickness is preferable. On the other hand, in view of the force generated by the actuator element, a larger thickness is preferable.

<Producing Method>

A method for producing the electrode film for the polymer actuator element of the present invention, while not being limited specifically, may be a method commonly used for producing polymer films.

Specifically, for example, the following methods can be used:
(i) a method including a step of kneading a fluororesin (A), a fluorine rubber (B), a cross-linking agent if needed, a cross-linking aid if needed, and a conductive filler (D) at a temperature not less than the melting point of the fluororesin, a step of forming a film of the kneading resultant, and a step of impregnating the film with an ionic liquid (C);
(ii) a method including a step of dissolving or dispersing polymers which can form a fluororesin (A) and/or a fluorine rubber (B), an ionic liquid (C), a conductive filler, a cross-linking agent, and a cross-linking aid if needed, in a solvent to make a film; or
(iii) a method including a step of dispersing a cross-linked fluorine rubber particle and a conductive filler in a solution in which a fluororesin (A) and an ionic liquid (C) are dissolved in a solvent, and a step of casting the resultant to make a film.

The solvent can be properly selected from solvents which can dissolve the fluororesin (A) and the like. Preferably, the solvent is a solvent including hydrophilic solvents and hydrophobic solvents with arbitrary ratios.

In the method for producing the electrode film for a polymer actuator element of the present invention, a method which includes a step of dissolving a fluororesin (A), a fluorine rubber (B), a cross-linking agent if needed, a cross-linking aid if needed, and an ionic liquid (C) to a solvent, a step of dispersing a conductive filler (D) in the solvent, a step of casting the obtained liquid to make a film, and a step of heating the film to cross-link the rubber components, is preferable because a uniform film can be produced.

The polymer actuator element of the present invention can be produced by methods commonly used. For example, films of each layer may be formed in order by a casting method using respective compositions, and a solvent is evaporated and the films are dried. Or, films individually made can be layered and adhered by heater press.

In this case, similar to that described above, the solvent is preferably a solvent including hydrophilic solvents and hydrophobic solvents with arbitrary ratios.

EXAMPLE

The present invention will now be explained in detail by means of Synthesis Examples, Examples, and Comparative Examples, but is not limited to them.

VdF ratios in electrode films and electrolyte films were determined through $^{19}$F NMR measurements of the electrode films and electrolyte films dissolved in acetone-d6 with Varian NMR System400, by using trifluoroacetic acid as a reference substance. The signals from −89 ppm to −110 ppm were identified as the signals derived from VdF, and the VdF ratios were calculated based on the ratio of the intensity of the signals derived from VdF to the intensity of the other signals.

Synthesis Example 1

Polymer of Fluorine Rubber 1500 ml of pure water and 7.5 g of perfluorooctanoic acid ammonium were placed into a pressure-resistant reactor having 3000 ml of inner volume, and the inside space of the reactor was filled by a gas mixture of tetrafluoroethylene (TFE), vinylidene fluoride (VdF) and hexafluoropropylene (HFP) with the mole ratio of 11:19:70. After that, the pressure inside of the reactor was increased to 1.47 MPa (gage pressure) (15 kg/cm$^2$ G), and 0.3 ml (25° C.) of I(CF$_2$ CF$_2$)$_2$ I was introduced into the reactor. Subsequently, 10 ml of an aqueous solution of ammonium persulfate (APS) having a concentration of 0.2% was injected at 80° C. while stirring. After the induced time of about a half of hour, the inside pressure was lowered. When the inside pressure was lowered to 1.27 MPa (gage pressure) (13 kg/cm$^2$ G), the pressure inside of the reactor was again increased to 1.47 MPa (gage pressure) (15 kg/cm$^2$ G) with a gas mixture of TFE, VdF and HFP with the mole ratio of 20:50:30. Thereafter, the polymerization was continued at the pressure within 1.27 to 1.47 MPa (gage pressure) (from 13 kg/cm$^2$ G to 15 kg/cm$^2$ G) with the above mentioned processes. After 20 hours, the polymerization was stopped by rapid cooling and decreasing the pressure through discharge. The dispersion having solid content concentration of about 25% was generated. The dispersion was precipitated with 7% aqua solution of aluminum potassium sulfate and, then, washed by water and dried so as to obtain the polymer. Hereinafter, the polymer is referred to as "Polymer A".

Synthesis Example 2

Electrolyte Film 1: Kynar Flex PPA 2801/Ethylmethylimidazolium Tetrafluoroborate 100 mg/100 mg of Kynar Flex PPA 2801 (a trade name; Arkema Co.)/ethylmethylimidazolium tetrafluoroborate, 3 ml of methylpentanone, and 900 mg of propylene carbonate (PC) were mixed together, and the mixture was stirred at 80° C. for 24 hours. 0.3 ml of the resulting solution was cast in a mould of 25 mm×25 mm and dried at 40° C. for 24 hours in vacuum to obtain an electrolyte film 1.

Synthesis Example 3

Electrolyte Film 2: Kynar Flex PPA 2801/Polymer A/Ethylmethylimidazolium Tetrafluoroborate 50 mg/50 mg/100 mg of Kynar Flex PPA 2801/Polymer A/ethylmethylimidazolium tetrafluoroborate, 3 ml of methylpentanone, and 900 mg of propylene carbonate were mixed together, and the mixture was stirred at 80° C. for 24 hours. 0.020 g of perbuthyl O and 0.020 g of TAIC were added to the obtained solution, and stirred at room temperature for 120 minutes. Subsequently, 0.3 ml of the resulting solution was cast in a mould of 25 mm×25 mm, dried at room temperature for 24 hours in vacuum, and cross-linked at 80° C. for 180 minutes to obtain an electrolyte film 2.

The VdF ratio of the electrolyte film was determined as 85.8 mole % based on the NMR analysis.

Example 1

Electrode Film 1: Kynar Flex PPA 2801 (70)/Polymer A (30)/Butylmethylimidazolium Tetrafluoroborate/HiPco Carbon Nanotube 30 mg of carbon nanotube of HiPco (a trade name; produced by Carbon Nanotechnology, Incorporated), 100 mg of butylmethylimidazolium tetrafluoroborate, zirconia ball (two of 10 mm and five of 5 mm), and 2 ml of methylpentanone were mixed together, and the mixture was compounded by a mixer at 400 rpm for 30 minutes to obtain a composite. 56 mg/24 mg of Kynar Flex PPA 2801/Polymer A and 2 ml of methylpentanone were mixed together and dispersed by ultrasonic wave for 10 minutes to obtain a solution. The solution was further mixed and compounded with the composite by a mixer at 500 rpm for 30 minutes.

2 ml of methylpentanone was added to the resultant and dispersed by ultrasonic wave for 180 minutes. 0.020 g of peroxide (Perhexa25B (a trade name); produced by Nippon Oil & Fats Co., Ltd.) and 0.020 g of TAIC were added to the obtained dispersion, and stirred at room temperature for 120 minutes. Subsequently, 3 ml of the resulting dispersion was cast in a mould of 84 mm×12 mm, dried at room temperature for 24 hours in vacuum, and cross-linked at 180° C. for 3 minutes to obtain an Electrode film 1.

The electrode film had the VdF ratio of 89.8 mole % as determined by the NMR analysis.

Example 2

Electrode Film 2: Kynar Flex PPA 2801 (50)/Polymer A (50)/Butylmethylimidazolium Tetrafluoroborate/HiPco Carbon Nanotube 30 mg of carbon nanotube of HIPCO, 100 mg of butylmethylimidazolium tetrafluoroborate, zirconia ball (two of 10 mm and five of 5 mm), and 2 ml of methylpentanone were mixed together, and the mixture was compounded by a mixer at 400 rpm for 30 minutes to obtain a composite. 40 mg/40 mg of Kynar Flex PPA 2801/Polymer A and 2 ml of methylpentanone were mixed together and dispersed by ultrasonic wave for 10 minutes to obtain a solution. The solution was further mixed and compounded with the composite by a mixer at 500 rpm for 30 minutes.

2 ml of methylpentanone was added to the resultant and dispersed by ultrasonic wave for 180 minutes. 0.020 g of Perhexa 25B and 0.020 g of TAIC were added to the obtained dispersion, and stirred at room temperature for 120 minutes. Subsequently, 3 ml of the resulting dispersion was cast in a mould of 84 mm×12 mm, dried at room temperature for 24 hours in vacuum, and cross-linked at 180° C. for 3 minutes to obtain an Electrode film 2.

The electrode film had the VdF ratio of 86.2 mole % as determined by the NMR analysis.

Example 3

Electrode Film 3: Kynar Flex PPA 2801 (70)/Polymer A (30)/Ethylmethylimidazolium Tetrafluoroborate/HiPco Carbon Nanotube 30 mg of carbon nanotube of HIPCO, 100 mg of ethylmethylimidazolium tetrafluoroborate, zirconia ball (two of 10 mm and five of 5 mm), 2 ml of methylpentanone, and 900 mg of propylene carbonate were mixed together, and the mixture was compounded by a mixer at 400 rpm for 30 minutes to obtain a composite. 56 mg/24 mg of Kynar Flex PPA 2801/Polymer A and 2 ml of methylpentanone were mixed together and dispersed by ultrasonic wave for 10 minutes to obtain a solution. The solution was further mixed and compounded with the composite by a mixer at 500 rpm for 30 minutes.

2 ml of methylpentanone was added to the resultant and dispersed by ultrasonic wave for 180 minutes. 0.020 g of Perhexa 25B and 0.020 g of TAIC were added to the obtained dispersion, and stirred at room temperature for 120 minutes. Subsequently, 3 ml of the resulting dispersion was cast in a mould of 84 mm×12 mm, dried at room temperature for 24 hours in vacuum, and cross-linked at 125° C. for 10 minutes to obtain an Electrode film 3.

The electrode film had the VdF ratio of 89.8 mole % as determined by the NMR analysis.

Example 4

Electrode Film 4: Kynar Flex PPA 2801 (50)/Polymer A (50)/Ethylmethylimidazolium Tetrafluoroborate/HiPco Carbon Nanotube 30 mg of carbon nanotube of HIPCO, 100 mg of ethylmethylimidazolium tetrafluoroborate, zirconia ball (two of 10 mm and five of 5 mm), 2 ml of methylpentanone, and 900 mg of propylene carbonete were mixed together, and the mixture was compounded by a mixer at 400 rpm for 30 minutes to obtain a composite. 40 mg/40 mg of Kynar Flex PPA 2801/Polymer A and 2 ml of methylpentanone were mixed together and dispersed by ultrasonic wave for 10 minutes to obtain a solution. The solution was further mixed and compounded with the composite by a mixer at 500 rpm for 30 minutes.

2 ml of methylpentanone was added to the resultant and dispersed by ultrasonic wave for 180 minutes. 0.020 g of Perhexa 25B and 0.020 g of TAIC were added to the obtained dispersion, and stirred at room temperature for 120 minutes. Subsequently, 3 ml of the resulting dispersion was cast in a mould of 84 mm×12 mm, dried at room temperature for 24 hours in vacuum, and cross-linked at 125° C. for 10 minutes to obtain an Electrode film 4.

The electrode film had the VdF ratio of 85.8 mole % as determined by the NMR analysis.

Example 5

Electrode Film 5: Kynar Flex PPA 2801 (30)/Polymer A (70)/Ethylmethylimidazolium Tetrafluoroborate/HiPco Carbon Nanotube 30 mg of carbon nanotube of HIPCO, 100 mg of ethylmethylimidazolium tetrafluoroborate, zirconia ball (two of 10 mm and five of 5 mm), 2 ml of methylpentanone, and 900 mg of propylene carbonete were mixed together, and the mixture was compounded by a mixer at 400 rpm for 30 minutes to obtain a composite. 24 mg/56 mg of Kynar Flex PPA 2801/Polymer A and 2 ml of methylpentanone were mixed together and dispersed by ultrasonic wave for 10 minutes to obtain a solution. The solution was further mixed and compounded with the composite by a mixer at 500 rpm for 30 minutes.

2 ml of methylpentanone was added to the resultant and dispersed by ultrasonic wave for 180 minutes. 0.020 g of Perhexa 25B and 0.020 g of TAIC were added to the obtained dispersion, and stirred at room temperature for 120 minutes. Subsequently, 3 ml of the resulting dispersion was cast in a mould of 84 mm×12 mm, dried at room temperature for 24 hours in vacuum, and cross-linked at 125° C. for 10 minutes to obtain an Electrode film 5.

The electrode film had the VdF ratio of 81.8 mole % as determined by the NMR analysis.

Example 6

Electrode Film 6: Kynar Flex PPA 2801 (30)/Polymer A (70)/Ethylmethylimidazolium Tetrafluoroborate/HiPco Carbon Nanotube 30 mg of carbon nanotube of HIPCO, 100 mg of ethylmethylimidazolium tetrafluoroborate, zirconia ball (two of 10 mm and five of 5 mm), 2 ml of methylpentanone, and 900 mg of propylene carbonete were mixed together, and the mixture was compounded by a mixer at 400 rpm for 30 minutes to obtain a composite. 24 mg/56 mg of Kynar Flex PPA 2801/Polymer A and 2 ml of methylpentanone were mixed together and dispersed by ultrasonic wave for 10 minutes to obtain a solution. The solution was further mixed and compounded with the composite by a mixer at 500 rpm for 30 minutes.

2 ml of methylpentanone was added to the resultant and dispersed by ultrasonic wave for 180 minutes. 0.020 g of Perbuthyl 0 and 0.020 g of TAIC were added to the obtained dispersion, and stirred at room temperature for 120 minutes. Subsequently, 3 ml of the resulting dispersion was cast in a mould of 84 mm×12 mm, dried at room temperature for 24 hours in vacuum, and cross-linked at 80° C. for 180 minutes to obtain an Electrode film 6.

The electrode film had the VdF ratio of 82.1 mole % as determined by the NMR analysis.

Example 7

Electrode Film 7: Kynar Flex PPA 2801 (50)/Polymer A (50)/Ethylmethylimidazolium Tetrafluoroborate/HiPco Carbon Nanotube 30 mg of carbon nanotube of HIPCO, 100 mg of ethylmethylimidazolium tetrafluoroborate, zirconia ball (two of 10 mm and five of 5 mm), 2 ml of methylpentanone, and 900 mg of propylene carbonete were mixed together, and the mixture was compounded by a mixer at 400 rpm for 30 minutes to obtain a composite. 40 mg/40 mg of Kynar Flex PPA 2801/Polymer A and 2 ml of methylpentanone were mixed together and dispersed by ultrasonic wave for 10 minutes to obtain a solution. The solution was further mixed and compounded with the composite by a mixer at 500 rpm for 30 minutes.

2 ml of methylpentanone was added to the resultant and dispersed by ultrasonic wave for 180 minutes. 0.020 g of Perbuthyl 0 and 0.020 g of TAIC were added to the obtained dispersion, and stirred at room temperature for 120 minutes. Subsequently, 3 ml of the resulting dispersion was cast in a mould of 84 mm×12 mm, dried at room temperature for 24 hours in vacuum, and cross-linked at 80° C. for 180 minutes to obtain an Electrode film 7.

The electrode film had the VdF ratio of 86.2 mole % as determined by the NMR analysis.

Example 8

Electrode Film 8: Kynar Flex PPA 2801 (70)/Polymer A (30)/Ethylmethylimidazolium Tetrafluoroborate/HiPco Carbon Nanotube 30 mg of carbon nanotube of HIPCO, 100 mg of ethylmethylimidazolium tetrafluoroborate, zirconia ball (two of 10 mm and five of 5 mm), 2 ml of methylpentanone, and 900 mg of propylene carbonete were mixed together, and the mixture was compounded by a mixer at 400 rpm for 30 minutes to obtain a composite. 56 mg/24 mg of Kynar Flex PPA 2801/Polymer A and 2 ml of methylpentanone were mixed together and dispersed by ultrasonic wave for 10 minutes to obtain a solution. The solution was further mixed and compounded with the composite by a mixer at 500 rpm for 30 minutes.

2 ml of methylpentanone was added to the resultant and dispersed by ultrasonic wave for 180 minutes. 0.020 g of Perbuthyl 0 and 0.020 g of TAIC were added to the obtained dispersion, and stirred at room temperature for 120 minutes. Subsequently, 3 ml of the resulting dispersion was cast in a mould of 84 mm×12 mm, dried at room temperature for 24 hours in vacuum, and cross-linked at 80° C. for 180 minutes to obtain an Electrode film 8.

The electrode film had the VdF ratio of 89.8 mole % as determined by the NMR analysis.

Example 9

Element 1: Electrode film of Example 1 and Electrolyte film of Synthesis Example 2

Electrolyte film 1 was sandwiched between two Electrode films 1 (1 mm×15 mm), and the resultant was heater-pressed under no pressure at 80° C. for 1 minute to be softened. Subsequently, the resultant was pressed with 135N at 80° C. for 1 minute to obtain Element 1.

Example 10

Element 2: Electrode Film of Example 2 and Electrolyte Film of Synthesis Example 2

Electrolyte film 1 was sandwiched between two Electrode films 2 (1 mm×15 mm), and the resultant was heater-pressed under no pressure at 80° C. for 1 minute to be softened. Subsequently, the resultant was pressed with 135N at 80° C. for 1 minute to obtain Element 2.

Example 11

Element 3: Electrode Film of Example 3 and Electrolyte Film of Synthesis Example 2

Electrolyte film 1 was sandwiched between two Electrode films 3 (1 mm×15 mm), and the resultant was heater-pressed under no pressure at 80° C. for 1 minute to be softened. Subsequently, the resultant was pressed with 135N at 80° C. for 1 minute to obtain Element 3.

Example 12

Element 4: Electrode Film of Example 5 and Electrolyte Film of Synthesis Example 2

Electrolyte film 1 was sandwiched between two Electrode films 5 (1 mm×15 mm), and the resultant was heater-pressed under no pressure at 80° C. for 1 minute to be softened. Subsequently, the resultant was pressed with 135N at 80° C. for 1 minute to obtain Element 4.

Example 13

Element 5: Electrode Film of Example 6 and Electrolyte Film of Synthesis Example 2

Electrolyte film 1 was sandwiched between two Electrode films 6 (1 mm×15 mm), and the resultant was heater-pressed under no pressure at 80° C. for 1 minute to be softened. Subsequently, the resultant was pressed with 135N at 80° C. for 1 minute to obtain Element 5.

Example 14

Element 6: Electrode Film of Example 8 and Electrolyte Film of Synthesis Example 2

Electrolyte film 1 was sandwiched between two Electrode films 8 (1 mm×15 mm), and the resultant was heater-pressed under no pressure at 80° C. for 1 minute to be softened.

Subsequently, the resultant was pressed with 135N at 80° C. for 1 minute to obtain Element 6.

Comparative Example 1

Electrode Film 9: Kynar Flex PPA 2801/Ethylmethylimidazolium Tetrafluoroborate/HiPco Carbon Nanotube 30 mg of carbon nanotube of HIPCO, 100 mg of ethylmethylimidazolium tetrafluoroborate, zirconia ball (two of 10 mm and five of 5 mm), 2 ml of methylpentanone, and 900 mg of propylene carbonete were mixed together, and the mixture was compounded by a mixer at 400 rpm for 30 minutes to obtain a composite. 80 mg of Kynar Flex PPA 2801 and 2 ml of methylpentanone were mixed together and dispersed by ultrasonic wave for 10 minutes to obtain a solution. The solution was further mixed and compounded with the composite by a mixer at 500 rpm for 30 minutes.

2 ml of methylpentanone was added to the resultant and dispersed by ultrasonic wave for 180 minutes, and stirred at room temperature for 120 minutes. Subsequently, 3 ml of the resulting dispersion was cast in a mould of 84 mm×12 mm, dried at room temperature for 24 hours in vacuum, and dried at 60° C. for 24 hours in vacuum to obtain an Electrode film 9.

Comparative Example 2

Element 7: Electrode Film of Comparative Example 1 and Electrolyte Film of Synthesis Example 2

Electrolyte film 1 was sandwiched between two Electrode films 9 (1 mm×15 mm), and the resultant was heater-pressed under no pressure at 80° C. for 1 minute to be softened. Subsequently, the resultant was pressed with 135N at 80° C. for 1 minute to obtain Element 7.

Test Example 1

Young's Modulus Test of Electrode Films for Polymer Actuator Elements

Young's moduli of electrode films for polymer actuator elements produced in the above-mentioned Examples and Comparative Examples were obtained through measurements of their stress-strain characteristics with a tensile tester (TMA/SS6000, Seiko Instrument Co.).

The results are shown in Table 1.

TABLE 1

(Young's modulus of electrode films for polymer actuator elements <MPa>)

| Comparative Example 1 | Example 1 | Example 2 | Example 3 | Example 4 | Example 5 | Example 6 | Example 7 | Example 8 |
|---|---|---|---|---|---|---|---|---|
| 182 | 56.5 | 39.1 | 58.0 | 30.6 | 32.0 | 30.0 | 46.8 | 48.0 |

Test Example 2

Displacement Amount Test of Polymer Actuator Elements

Figure 5:
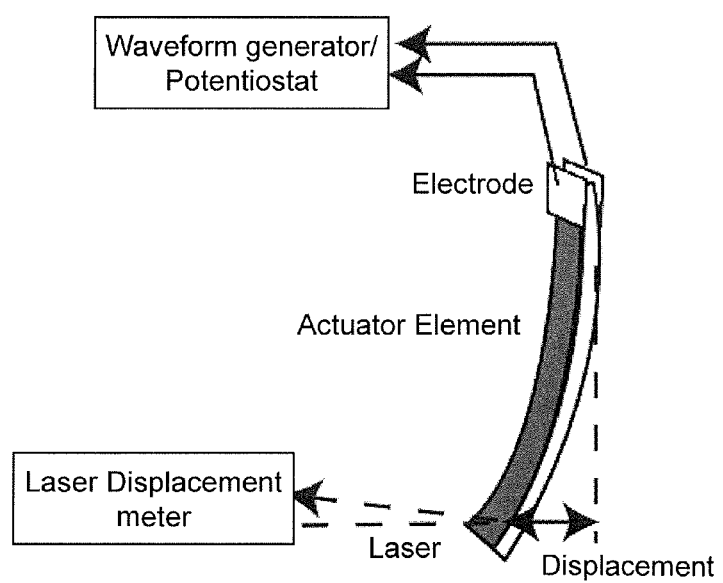
FIG. 5 is a diagram explaining an equipment for measuring displacement of a polymer actuator element.

As shown in FIG. 5, displacement amounts of polymer actuator elements produced in the above-mentioned Examples and Comparative Examples were measured with a laser displacement meter (LC2100/2220; Keyence Co.). The elements were cut into 1 mm×15 mm rectangles to obtain samples. The displacement amount of each sample, upon application of a voltage, was measured at a position corresponding to the $10^{th}$ mm of the 15 mm-long sample.

The results are shown in Table 2.

TABLE 2

(Displacement amount of polymer actuator elements)

| | | | Comparative Example 1 | Example 1 | Example 10 | Example 11 | Example 12 | Example 13 | Example 14 |
|---|---|---|---|---|---|---|---|---|---|
| Displacement amount (mm) | 0.1 Hz | ±0.5 V | 0.2 | 0.2 | 0.3 | 0.4 | 0.5 | 0.3 | 0.2 |
| | | ±1.0 V | 0.3 | 0.3 | 0.6 | 0.8 | 1.1 | 0.7 | 0.5 |
| | | ±1.5 V | 0.5 | 0.5 | 1.0 | 1.4 | 2.0 | 1.3 | 1.0 |
| | | ±2.0 V | 0.8 | 0.8 | 1.3 | 2.8 | 3.5 | 2.0 | 1.7 |
| | | ±2.5 V | 1.1 | 1.0 | 1.7 | 4.8 | 5.5 | 2.9 | 2.8 |
| | 0.01 Hz | ±0.5 V | 0.3 | 0.7 | 0.8 | 0.5 | 0.6 | 0.4 | 0.3 |
| | | ±1.0 V | 0.6 | 1.5 | 1.5 | 1.0 | 1.3 | 1.0 | 1.1 |
| | | ±1.5 V | 1.2 | 2.2 | 2.3 | 1.9 | 3.1 | 2.9 | 3.5 |
| | | ±2.0 V | 2.6 | 3.3 | 3.9 | 4.1 | 7.7 | 6.5 | — |
| | | ±2.5 V | 4.5 | 4.7 | 5.9 | — | — | — | — |
| Thickness of Displacement Element Film (mm) | | | 0.172 | 0.182 | 0.168 | 0.141 | 0.164 | 0.184 | 0.238 |

INDUSTRIAL APPLICABILITY

The polymer actuator element comprising the electrode film for the polymer actuator element of the present invention can be used in air or in vacuum, and has a large displacement amount, a high displacement rate, and generates a large force at the time of displacement. Therefore, the polymer actuator element can be widely used in the fields of medical instruments, equipment for industrial use, personal robot, micromachine, and the like.

What is claimed is:

1. An electrode film for a polymer actuator element, the electrode film comprising:
    a fluororesin, a fluorine rubber, an ionic liquid, and a conductive filler.
2. The electrode film of claim 1, wherein
    at least one of the fluororesin and the fluorine rubber contains a vinylidene fluoride unit.
3. The electrode film of claim 2, wherein
    a ratio of the vinylidene fluoride unit to an entirety of the fluororesin and fluorine rubber is not less than 60 mole %.
4. The electrode film of claim 3, wherein
    the fluorine rubber is a cross-linked fluorine rubber.
5. The electrode film of claim 4, wherein
    a weight ratio of the fluororesin to the fluorine rubber is from 80:20 to 20:80.
6. The electrode film of claim 5, wherein
    the electrode film includes
        5 to 70% by weight of the fluororesin and the fluorine rubber as a whole,
        20 to 80% by weight of the ionic liquid, and
        1 to 40% by weight of the conductive filler.
7. A polymer actuator element including the electrode film according to claim 6.
8. The electrode film of claim 2, wherein
    the fluorine rubber is a cross-linked fluorine rubber.
9. The electrode film of claim 2, wherein
    a weight ratio of the fluororesin to the fluorine rubber is from 80:20 to 20:80.
10. The electrode film of claim 2, wherein
    the electrode film includes
        5 to 70% by weight of the fluororesin and the fluorine rubber as a whole,
        20 to 80% by weight of the ionic liquid, and
        1 to 40% by weight of the conductive filler.
11. A polymer actuator element including the electrode film according to claim 2.
12. The electrode film of claim 1, wherein
    the fluorine rubber is a cross-linked fluorine rubber.
13. The electrode film of claim 12, wherein
    a weight ratio of the fluororesin to the fluorine rubber is from 80:20 to 20:80.
14. The electrode film of claim 13, wherein
    the electrode film includes
        5 to 70% by weight of the fluororesin and the fluorine rubber as a whole,
        20 to 80% by weight of the ionic liquid, and
        1 to 40% by weight of the conductive filler.
15. A polymer actuator element including the electrode film according to claim 14.
16. The electrode film of claim 1, wherein
    a weight ratio of the fluororesin to the fluorine rubber is from 80:20 to 20:80.
17. The electrode film of claim 1, wherein
    the electrode film includes
        5 to 70% by weight of the fluororesin and the fluorine rubber as a whole,
        20 to 80% by weight of the ionic liquid, and
        1 to 40% by weight of the conductive filler.
18. A polymer actuator element including the electrode film according to claim 1.

* * * * *